(12) United States Patent
Lee et al.

(10) Patent No.: US 6,826,327 B1
(45) Date of Patent: Nov. 30, 2004

(54) TUNABLE NARROW BAND OPTICAL FILTER

(75) Inventors: Chang-Hee Lee, Taejon (KR); Wayne V. Sorin, Mountain View, CA (US); Steven L. Shepherd, Monte Sereno, CA (US)

(73) Assignee: Novera Optics, Inc., Palo Alto, CA (US)

( * ) Notice: Subject to any disclaimer, the term of this patent is extended or adjusted under 35 U.S.C. 154(b) by 214 days.

(21) Appl. No.: 10/024,905

(22) Filed: Dec. 18, 2001

(51) Int. Cl.[7] .............................. G02B 6/26; G02F 1/335

(52) U.S. Cl. .............................. 385/28; 385/29; 385/7

(58) Field of Search ...................... 385/1, 7, 10, 27–29, 385/37, 39, 123

(56) References Cited

U.S. PATENT DOCUMENTS

| | | | |
|---|---|---|---|
| 4,068,191 A | | 1/1978 | Zemon et al. |
| 4,781,425 A | | 11/1988 | Risk et al. |
| 4,832,437 A | | 5/1989 | Kim et al. |
| 4,915,468 A | | 4/1990 | Kim et al. |
| 5,022,732 A | | 6/1991 | Engan et al. |
| 5,263,037 A | * | 11/1993 | Trutna et al. ............... 372/20 |
| 5,652,809 A | | 7/1997 | Aronson |
| 5,781,268 A | * | 7/1998 | Liu et al. .................. 349/198 |
| 6,021,237 A | | 2/2000 | Kim et al. |
| 6,151,427 A | * | 11/2000 | Satorius ...................... 385/7 |
| 6,233,379 B1 | | 5/2001 | Kim et al. |
| 6,253,002 B1 | | 6/2001 | Kim et al. |
| 6,266,462 B1 | * | 7/2001 | Kim et al. .................. 385/28 |
| 6,343,165 B1 | | 1/2002 | Kim et al. |
| 6,631,224 B2 | | 10/2003 | Sorin et al. |

OTHER PUBLICATIONS

Seok Hyun Yun et al., "Suppression of polarization dependence in a two–mode–fiber acousto–optic device", 1996 Optical Society of America, Optics Letters, vol. 21, No. 12, Jun. 15, 1996, pp. 908–910.

Seok Hyun Yun et al., "All–fiber tunable filter and laser based on two–mode fiber", 1996 Optical Society of America, Optics Letters vol. 21, No. 1, Jan. 1, 1996, pp. 27–29.

B.Y. Kim, J. N. Blake, H.E. Engan, and H.J. Shaw, "Acousto–optic frequency–shifting in two–mode optical fibers," OFS '86, Tokyo, Japan (Oct. 8–10, 1986).

J. O. Askautrud and H.E. Engan, "Fiberoptic frequency shifter with no mode change using cascaded acousto–optic interaction regions," Optics Letters, vol. 15, No. 11, pp. 649–651 (Jun. 1, 1990).

D. Ostling and H.E. Engan, "Narrow–band acousto–optic tunable filtering in a two–mode fiber," Optics Letters, vol. 20, No. 11, pp. 1247–1249 (Jun. 1, 1995).

T.A. Birks, P.S.J. Russell, and C.N. Pannell, "Low power acousto–optic device based on a tapered single–mode fiber," IEEE Photonics Technology Lett., vol. 6, No. 6, pp. 725–727 (Jun. 1994).

W.P. Risk, G.S. Kino, and B.T. Khuri–Yakub, "Tunable optical filter in fiber–optic form," Optics Letters, vol. 11, No. 9, pp. 578–580 (Sep. 1986).

M.Y. Jeon, et al., "An Electronically Wavelength–Tunable Mode–Locked Fiber Laser Using an All–Fiber Acoustooptic Tunable Filter," IEEE Photonics Technology Letters, vol. 8, No. 12, pp. 1618–1620 (Dec. 1996).

(List continued on next page.)

*Primary Examiner*—Brian Healy
*Assistant Examiner*—Sarah U Song
(74) *Attorney, Agent, or Firm*—Blakely, Sokoloff, Taylor & Zafman LLP (57) ABSTRACT

A method, an apparatus and a system are described for receiving an optical signal in an optical filter and routing the optical signal through the optical filter multiple times.

31 Claims, 9 Drawing Sheets

OTHER PUBLICATIONS

H.S. Kim, et al., "All–fiber acousto–optic tunable notch filter with electronically controllable spectral profile," Optics Letters, vol. 22, No. 19, pp. 1476–1478 (Oct. 1, 1997).

B.Y. Kim, "Acousto–Optic Components for WDM Applications," IEEE/LEOS Summer Topical Meetings, San Diego, California, USA, pp. 47–48, Invited Papers (Jul. 26–28, 1999).

* cited by examiner

Cascaded Filter Response

TUNABLE NARROW BAND OPTICAL FILTER

FIELD OF THE INVENTION

This invention generally relates to optical components such as an optical monitoring device. More particularly this invention relates to tunable optical bandpass filters.

BACKGROUND OF THE INVENTION

It is essential to monitor optical signals for highly reliable WDM systems. However, it becomes difficult to resolve each individual optical channel for power measurement because the individual channel spacing in DWDM systems decreases in order to increase transmission capacity. A very narrow band optical filter may be used to extract one channel in the DWDM signals. Bulk optic narrow band optical filters typically require advanced technologies and are typically expensive.

Bulk optic narrow band optical filters exist that use a Fabry Perot filter having movable mirrors. The movable mirrors cause resonant frequency changes in the optical signal. These narrow band optical filters may create a transmission spectrum narrow enough to extract one channel of a DWDM filter for analysis. The construction of these precise movable mirrors is typically expensive and the filter may have high insertion losses.

All-fiber optical filters typically have lower insertion losses on the optical signal than bulk optic filters. Most all-fiber optical filters, however have a bandwidth of a wide band tunable filter that is usually several nanometers. The corresponding transmission response is an order of magnitude wider than that of the required bandwidth for performance monitoring of the DWDM signal.

All-fiber type filters typically employ a filtering effect using the relation between modes of light propagating in an optical fiber. In principle, a light wave propagates through the core of optical fiber as the light wave totally reflects at an interface between the core and cladding of the optical fiber. On the other hand, the light wave has difficulty in propagating through the cladding of the optical fiber because the jacket surrounding the cladding is highly absorptive and its refractive index is higher than that of the cladding, which causes strong attenuation.

If the jacket is stripped—that is, if the cladding is exposed in the air—the light wave can propagate farther because the light wave is totally reflected at the interface between the cladding and air due to the higher refractive index of the cladding than that of air.

The mode for a light wave that propagates satisfying the total reflection condition at the interface of core and cladding may be referred to as a "core mode." The mode for a light wave that propagates satisfying the total reflection condition at the boundary surface of cladding and surrounding air, while failing to satisfy the total reflection condition at core/cladding interface, is called "cladding mode."

In core mode, most of the energy of the optical signal is distributed in the core. In cladding mode, most of the energy of the optical signal is distributed in the cladding.

SUMMARY OF THE INVENTION

Various methods, apparatuses, and systems are described for routing an optical signal through the optical filter multiple times.

Other features and advantages of the present invention will be apparent from the accompanying drawings and from the detailed description that follows below.

BRIEF DESCRIPTION OF THE DRAWINGS

The present invention is illustrated by example and not limitation in the figures of the accompanying drawings, in which like references indicate similar elements and in which.

DETAILED DESCRIPTION

In general, one or more methods and apparatuses herein describe receiving an optical signal in an optical filter and routing the optical signal through the optical filter multiple times. Reflecting the optical signal multiple times narrows the transmission spectrum developed by the bandpass filter.

The signal strength of the optical signal reduces with each pass through the bandpass filter. If a transmission spectrum under analysis is narrow enough, then, for example, optical characteristics of individual DWDM channels may be precisely measured. Further, one or more methods and apparatus herein describe selectively removing wavelengths from an optical signal via coupling by applying acoustics waves to induce the coupling. Further, many other methods and apparatuses herein describe developing a given transmission spectrum in an optical filter. For one embodiment, coupling means transitioning energy from one spatial propagation mode to another spatial propagation mode.

Figure 1A:
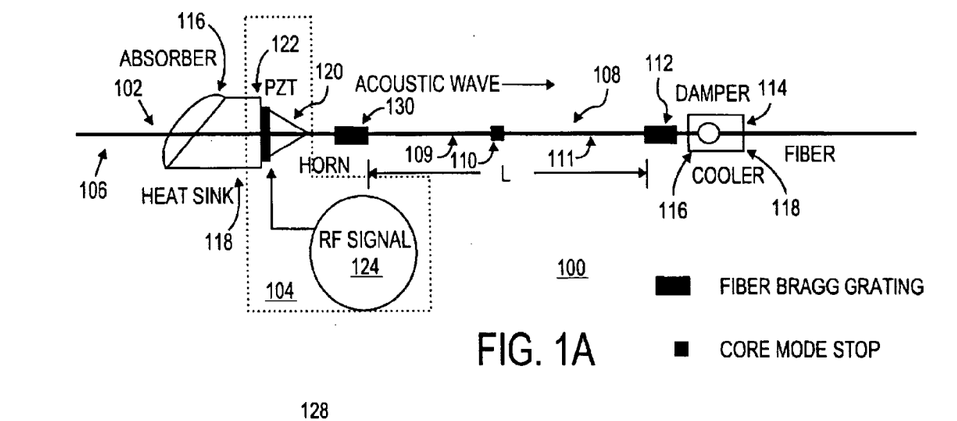
FIG. 1a is a block diagram of an embodiment of an acousto-optical filter tunable bandpass filter aligned to facilitate multiple passes of an optical signal through the bandpass filter.

FIG. 1a is a block diagram of an embodiment of an acousto-optical filter tunable bandpass filter aligned to facilitate multiple passes of a band of wavelengths within the optical signal through the bandpass filter. For one embodiment, the tunable narrow-band bandpass filter 100 may include an optical signal input 102, an acoustic wave exciter 104; an optical waveguide 106 having an interaction region 108, two or more reflectors, such as first reflector 130 and a second reflector 112, aligned to facilitate multiple passes of the band of wavelengths within the optical signal through the interaction region 108. The tunable narrow-band bandpass filter may further include light-absorbing material 110 such as a core blocker, interposed between the first reflector 130 and the second reflector 112, and an optical signal output 114. Further, the tunable bandpass filter 100 may include one or more acoustic wave absorbers 116 connected to the interaction region 108 and a heat sink 118 connected to each acoustic wave absorber 116.

For one embodiment, the acoustic wave exciter 104 may comprise a propagation member 120 such as a horn, an acoustic wave generator 122 such as a transducer, and a signal generator 124 such as an RF signal generator. For one embodiment, the signal generator 124 applies an RF signal to the acoustic wave generator 122. The acoustic wave generator 122 generates an acoustic wave through the propagation member 120. The acoustic wave exciter 104 generates the acoustic wave at a first frequency that corresponds to a first center optical wavelength. The propagation member 120 amplifies and transmits the acoustic wave to vibrate the interaction region 108.

Figure 2:
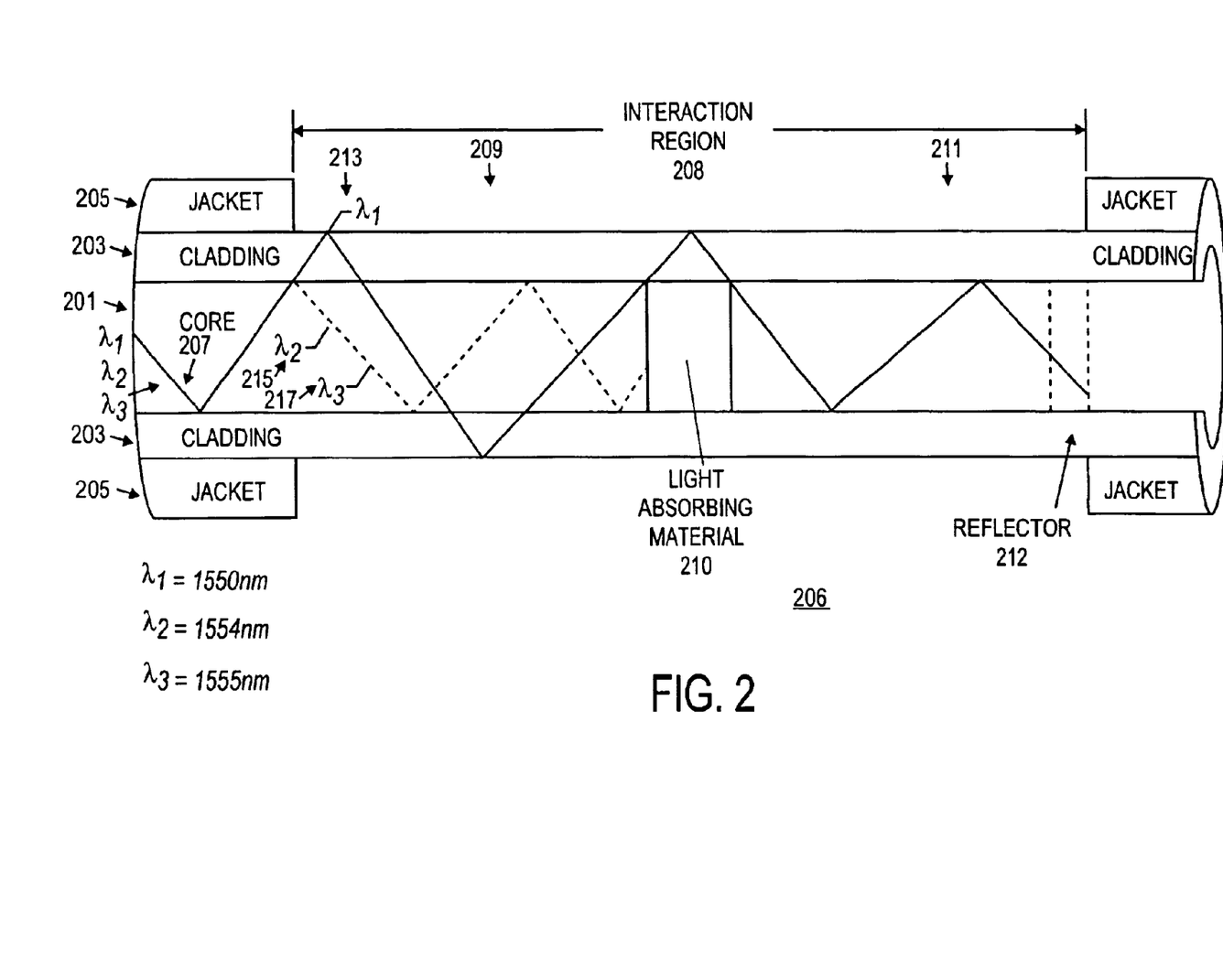
FIG. 2 is a magnified view of an embodiment of the interaction region containing light absorbing material blocking various wavelengths of the optical signal in the core of the optical waveguide.

FIG. 2 is a magnified view of an embodiment of the interaction region containing light absorbing material blocking various wavelengths of the optical signal in the core of the optical waveguide. For one embodiment, the optical waveguide 206 may have a core 201, a cladding 203, and optionally a structural protective casing such as a jacket 205. For one embodiment, the interaction region 208 in the optical waveguide is where the jacket 205 is removed. The removal of the jacket minimizes damping vibration of the interaction region 208 caused by the vibration of the acoustic wave. The interaction region 208 may have a first portion 209 and a second portion 211. The acoustic wave propagates as a traveling flexural wave along the interaction region 208. The periodic microbend effects induce antisymmetric refractive index changes in the interaction region 208 of the optical wave guide 206.

Figure 1B:
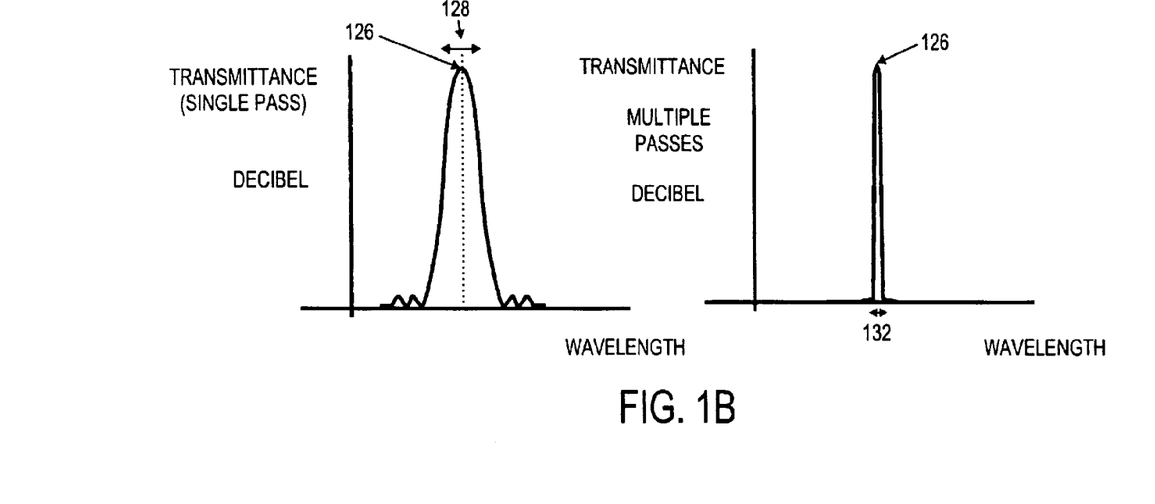
FIG. 1b is an exemplary graph illustrating a transmission spectrum developed after a first pass through the tunable bandpass filter and the reduced transmission spectrum developed by the tunable bandpass filter after multiple passes through the tunable bandpass filter.

FIG. 1b is an exemplary graph illustrating a transmission spectrum developed after a first pass through the tunable bandpass filter and the reduced transmission spectrum developed by the tunable bandpass filter after multiple passes through the tunable bandpass filter. Referring to FIGS. 1a and 1b, the interaction region 108 receives the optical signal such as a light wave. The propagation member 120 transmits the acoustic wave at a particular frequency to the interaction region 108. The acoustic wave exciter 104 causes a band of optical wavelengths centered around the first center optical wavelength 126 in the optical signal to couple from a first mode such as a core mode to a second mode, such as a cladding mode, in the optical waveguide 106. The band of desired optical wavelengths within the transmission spectrum 128 couples to the second mode while the undesired optical wavelengths remain in the first mode. The light absorbing material 110 absorbs the energy of the optical signal in the first mode, thereby eliminating the undesired optical wavelengths that are not within the transmission spectrum 128.

Referring to FIG. 2, the optical signal 207 may contain multiple discrete optical wavelengths, such as a first optical wavelength at 1550 nanometers (nm) 213, a second optical wavelength at 1554 nm 215, and a third optical wavelength at 1555 nm 217. The acoustic wave exciter 104 applies the acoustic wave to couple the desired center optical wavelength of 1550 nm 213 from the core mode to the cladding mode in the first portion 209 of the interaction region 208. The second optical wavelength 215 and third optical wavelength 217 have wavelength values that are outside the band of wavelengths affected by the acoustic wave. Thus, the second optical wavelength 215 and third optical wavelength 217 continue to propagate through the core 201 and are absorbed by the light absorbing material 210 located in the core 201. In contrast, the first optical wavelength 213 propagates in the cladding 203 past the light absorbing material 210 located in the core 201 to a second portion 211 of the interaction region 208. A reflector 212 exists at both ends of the interaction region 208 to facilitate multiple passes of the optical signal 207 through the interaction region 208. The forward traveling first optical wavelength 213 strikes the reflector 212 and propagates through the interaction region again in the backward direction. Note only the second reflector 212 is illustrated in FIG. 2 in order to eliminate confusion in the drawing.

Referring to FIG. 1a, the interaction region 108 may include the first portion 109 and the second portion 111. The light absorbing material 110 may be interposed between the first portion 109 of the interaction region 108 and the second portion 111 of the interaction region 108. The length of each portion 109, 111 of the interaction region 108 may be based upon the optical wavelength spectrum of the optical signal, the frequency of the acoustic wave, and the type of the fiber. The length of the first portion 109 of the interaction region is such that the optical signal when exposed to the acoustic wave causes the desired optical wavelength signal to couple from the first mode to the second mode prior to reaching the location of the light absorbing material 110. Further, the length of the second portion 111 of the interaction region 108 is such that the desired optical wavelengths when exposed to the acoustic wave causes the desired optical wavelengths to couple back from the second mode to the first mode after propagating past the location of the light absorbing material 110. For one embodiment, the initial range of wavelengths within the transmission spectrum after the first pass of the optical signal through the interaction region is proportional to the length of each portion 109, 111.

The first reflector 130 and the second reflector 112 are aligned to reflect the desired band of wavelengths bidirectionally through the interaction region 108, the acoustic wave, and the light absorbing material 110 multiple times. The first reflector 130 and second reflector 112 may have a reflectivity less than one hundred percent. The optical signal is reflected between the first reflector 130 and second reflector 112 through the interaction region 108 to increase the Q of the bandpass filter and narrow the transmission spectrum of the optical wave lengths that are passed through the bandpass filter.

Referring to FIG. 1b, after each pass through the bandpass filter the transmission spectrum 128 of optical wavelengths that are passed narrows. Eventually, after multiple passes through the interaction region, the remaining optical signal retains the same center optical wavelength 126 with a very narrow transmission spectrum, such as the second transmission spectrum 132. Thus, a very precise discrete range of optical wavelengths may be developed and thus analyzed within a wide band of optical wavelengths.

Referring to FIGS. 1a and 1b, the first center optical wavelength 126 is proportional to frequency of the acoustic wave generated by the signal generator 124. Therefore, the acoustic wave exciter 104 may adjust the radio frequency generated by the signal generator 124 in order to select the desired center optical wavelength 126 in the optical signal that is to be coupled from the first mode to the second mode.

Referring to FIG. 1a, the one or more acoustic wave absorbers 116 absorb the vibrational energy of the acoustic wave to stop the microbend effects on the optical waveguide 106. The heat sink 118 connected to each acoustic wave absorber 116 dissipates the excess energy generated by the vibrational energy, if needed. After the multiple passes develop the discrete optical wavelength, the small percentage of the optical signal that is not reflected back into the interaction region 108 may be collected as the output signal from the tunable bandpass filter 100.

Figure 3:
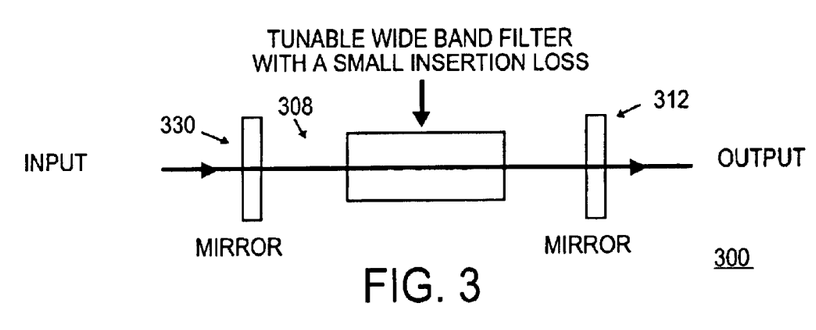
FIG. 3 is a block diagram of an embodiment of an optical filter having two or more reflectors aligned to reflect the optical signal bi-directionally through the interaction region.

FIG. 3 is a block diagram of an embodiment of an optical filter having two or more reflectors aligned to reflect the optical signal bidirectionally through the interaction region. For one embodiment, the two or more reflectors such as the first reflector 330 and the second reflector 312, are aligned to reflect the optical signal bidirectionally through the interaction region 308 multiple times.

As noted above, the first reflector 330 reflects less than hundred percent of the optical wavelengths to narrow the spectrum of wavelengths contained within the optical signal. The reflection of the optical signal starts the multiple pass process to develop a very precise and narrow transmission spectrum. For one embodiment, the two or more reflectors 312, 330 route the optical signal through the interaction region 308 multiple times, such as twenty-five times. For one embodiment, the effective bandwidth of the transmission spectrum of the tunable bandpass filter is $1/N^{1/2}$ times that of the bandpass filter for the first pass of the optical signal through the interaction region 308, where N is the number of times the optical signal propagates through the interaction region 308. The maximum number of passes through the tunable bandpass filter 300 depends on the insertion loss that occurs while traveling through the tunable bandpass filter 300.

Figure 4:
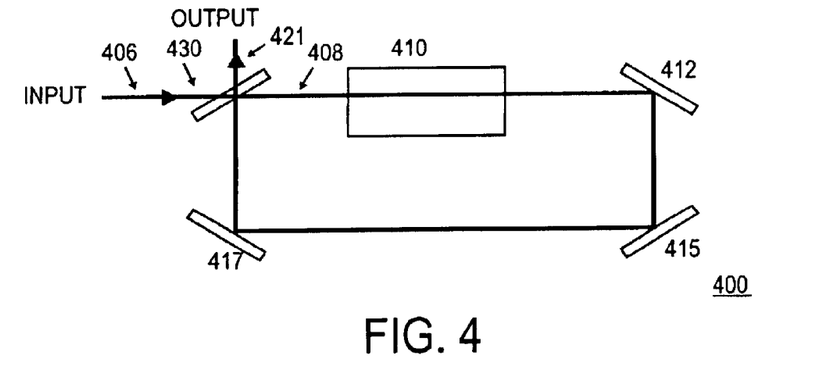
FIG. 4 is a block diagram of an embodiment the two or more reflectors that are aligned to reflect the optical signal in a unidirectional path multiple times through the interaction region.

FIG. 4 is a block diagram of an embodiment of two or more reflectors that are aligned to reflect the optical signal in a unidirectional path multiple times through the interaction region. For one embodiment, the narrow band bandpass filter 400 may contain a first reflector 430, a second reflector 412, a third reflector 415, a fourth reflector 417, and light absorbing material 410.

The entering optical signal may propagate through the first reflector 430. A band of desired optical wavelengths in response to the effect of the acoustic wave on the optical waveguide couple from the first mode to the second mode in the interaction region 408. The band of desired optical wavelengths propagate in the second mode past the light absorbing material 410 while the unaffected wavelengths are absorbed. The second reflector 412, third reflector 415 and fourth reflector 417 reflect the band of desired optical wavelengths at an angle to route the optical signal back to the first reflector 430. The first reflector 430 then reflects the band of desired optical wavelengths through the interaction region 408 again. The optical signal reflects this way through the tunable bandpass filter 400 multiple times to narrow the transmission spectrum of the band of wavelengths to a desired bandwidth of optical wavelengths. When the desired transmission spectrum is developed, then a small percentage of the optical signal which is not reflected toward the light absorbing material 410 by the first reflector 430 is collected as the output signal 421 of the tunable bandpass filter 400. This output signal 421 containing the narrow transmission spectrum may be supplied to analytical components to determine optical characteristic of that transmission spectrum.

In an alternate embodiment, the optical signal propagates through multiple cascaded interaction regions to develop the narrow transmission spectrum rather than being reflected to make multiple passes through the same interaction region 408. The number of cascaded interaction regions depends on the insertion loss and the loss in the optical waveguide.

Figure 5:
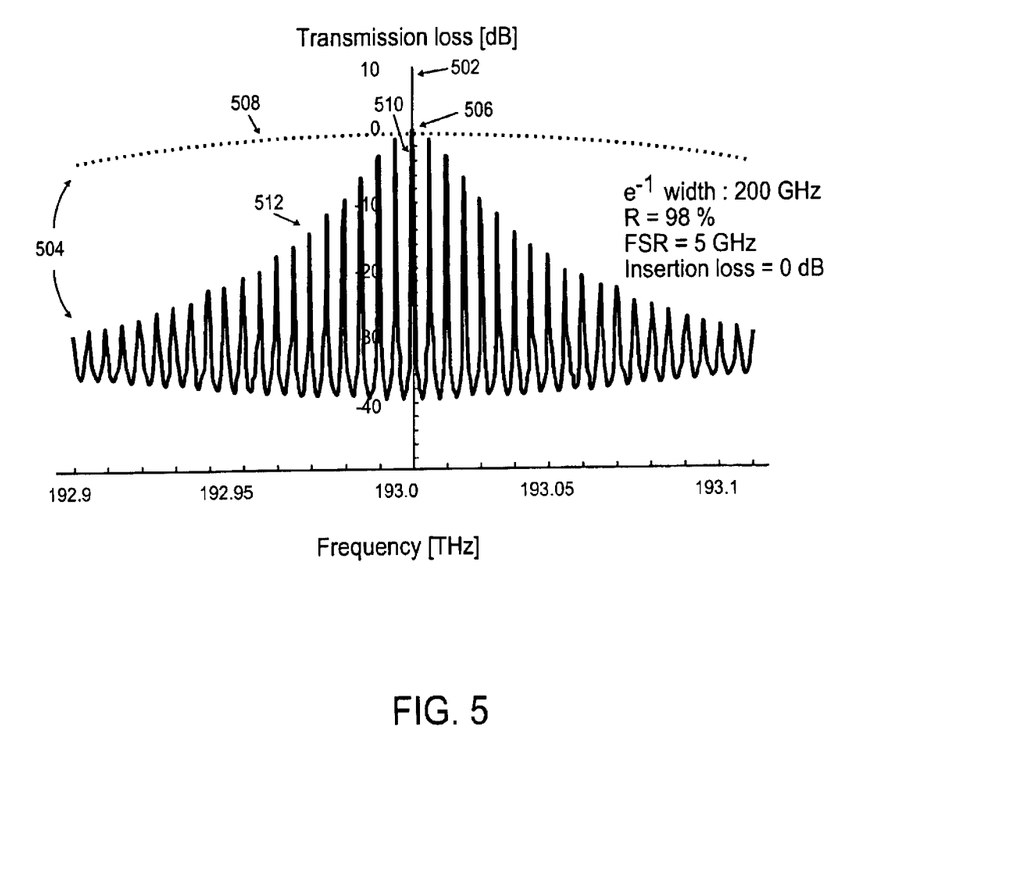
FIG. 5 is a graph of an exemplary transmission spectrum of the an embodiment of the tunable bandpass filter.

FIG. 5 is a graph of an exemplary transmission spectrum of the tunable bandpass filter. Vertically, the graph illustrates power level loss 502 in decibels of various optical wavelengths in the optical signal. The range of the power level loss 502 spans from 0 dB loss to minus 40 dB loss. The highest power level represented on the graph, 0 dB loss, corresponds to the optical signal strength after the first pass through the interaction region. Horizontally, the graph illustrates the transmission spectrum 504 of the optical wavelengths from the optical signal developed in the bandpass filter. The range of the transmission spectrum 504 spans from 192.9 Terahertz to 193.1 Terahertz. The center optical wavelength 506 being at 193.0 Terahertz and full optical power (i.e. 0 dB).

The dotted line represents the first transmission spectrum 508 of the bandpass filter after the first pass through the interaction region. In this example, the bandpass tunable filter has a Gaussian shape with e-1 width of 200 GHz. Thus, the first transmission spectrum 508 has a width at minus 3 dB 510 of approximately 333 GHz.

The solid line represents the second transmission spectrum 512 after multiple passes through the interaction region. Each optical wavelength within the second transmission spectrum 512 has a free spectral range of 5 GHz and the envelope of the second transmission spectrum 512 is about 17 GHz at minus 3 dB 510. Thus, only a band of 17 GHz of optical wavelengths remain in the second transmission spectrum 512 that have a signal power level of greater than a minus 3 dB. The transmission spectrum 504 decreased from 333 GHz at minus 3 dB 510 to 17 GHz at minus 3 dB 510. The transmission spectrum 504 passed by the bandpass filter after multiple passes through the interaction region has reduced by a factor of about 11.

Note, in this example, the reflectivity of the reflectors may be approximately 95%. If the reflectivity of the reflectors is set to 98%, then the transmission spectrum 504 may be reduced by a factor of 20 after multiple passes through the interaction region. The reflectivity at less than 100% allows the undesired optical wavelengths at or outside the cutoff frequencies to be eliminated and the Q of the filter to increase. For one embodiment, wavelengths other than the center optical wavelength decrease in signal strength by a factor proportional to the square root of their original signal strength after each pass through the interaction region. For one embodiment, the transmission spectrum 512 of the acoustical optical tunable filter is less than 18 Gigahertz.

For one embodiment, when the reflectors, comprising a Fabry-Perot cavity, reduce the bandwidth of the wide band tunable filter, 3 dB bandwidth of the transmission spectrum 512 is given by:

$$\Delta f_{3dB} = \text{Bandwidth of the wide band filter at } \Delta\alpha = 10 \log e^*(1-r)/r,$$

where r is intensity reflectivity of the reflector and $\Delta\alpha$ is the loss in dB of the wide band filter for bandwidth calculation. The formula may assume the loss of the wide band filter is 0 dB at the transmission peak and both reflector s have the same reflectivity r~1.

For one embodiment, a Gaussian wide band filter, 3 dB bandwidth of the band width of the transmission spectrum 512 is given by:

$$\Delta f_{3dB} = \Delta f_e[(1-r)/r]^{1/2}/2,$$

where $\Delta f_e$ is the $e^{-1}$ bandwidth of the wide band a Gaussian filter.

Various other configurations and implementations exist. For one embodiment, the two or more reflectors may be any combination of Fiber Bragg Gratings, mirrors, couplers, recirculator, or similar component to direct the optical signal in a specific direction. For one embodiment, the optical waveguide may be polarization preserving fiber. For one embodiment, the optical wave-guide comprises a single mode optical fiber. For an alternative embodiment, the optical waveguide may be a multi-mode fiber. For one embodiment, the optical wave-guide is planar in shape. For one embodiment, the light absorbing material can similarly be light scattering material such as a fiber Bragg grating aligned to reflect selected wavelengths at an angle out of the core. The optical waveguide may have multiple modes of traveling within the optical waveguide such as core-to-core, core-to-cladding, polarization-to-polarization, multiple cladding mode to a single core mode, and other similar optical modes.

Figure 6:
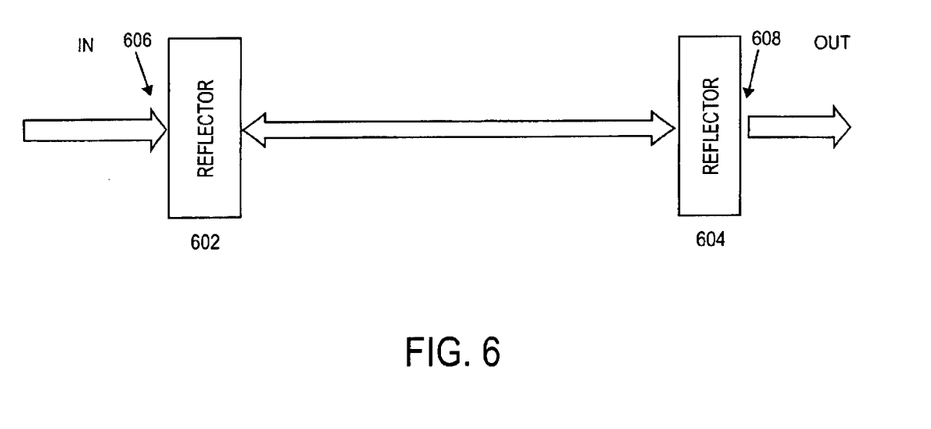
FIG. 6 is a block diagram of an embodiment or two or more reflectors aligned to reflect a portion of the optical signal between the reflectors multiple times.

FIG. 6 is a block diagram of an embodiment with two or more reflectors aligned to reflect a portion of the optical signal between the reflectors multiple times. The tunable bandpass filter comprises two or more reflectors such as a first reflector 602 and a second reflector 604, an input light signal 606, and an output light signal. The two or more reflectors, such as Fiber Bragg gratings, may be tunable to a band of optical wavelengths by thermally or mechanically compressing the Fiber Bragg gratings. Each reflector 602, 604 may possess a reflectivity of less than one hundred percent reflectivity. The first reflector 602 and the second reflector 604 may reflect the center wavelength and a band of wavelengths around the center wavelength, i.e. the transmission spectrum, back and forth between the first reflector and the second reflector multiple times. Each time the transmission spectrum is reflected the band of wavelengths within that transmission spectrum above a given signal strength such as minus 3 dB, narrows due to the reflection loss and the insertion loss associated with the traveling through the bandpass filter. Due to the reflection loss, the wavelengths that possess wavelength valves other than the center optical wavelength decrease significantly in signal strength. Signal strength may be measured in terms of optical power, intensity or amplitudes of the optical wavelength. For one embodiment, the percentage of the optical signal that is not reflected by the second reflector 604 may be collected as the output optical signal.

Figure 7A:
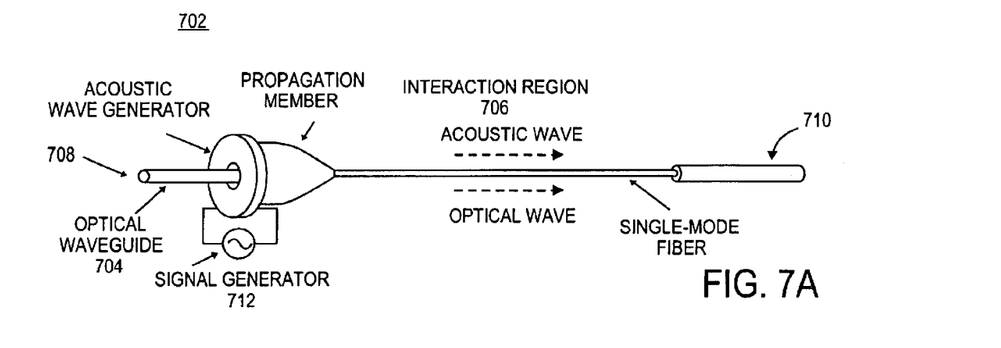
FIG. 7a is a block diagram of an embodiment of the acousto-optical tunable narrow band filter generating the amplitude and the frequency of an acoustic wave in order to control the attenuation on the corresponding optical center wavelength.

FIG. 7a is a block diagram of an embodiment of the acousto-optical tunable narrow band filter generating the amplitude and the frequency of an acoustic wave in order to control the attenuation on the corresponding optical center wavelength. The tunable narrow band filter may include one or more acoustic wave exciters 702, an optical waveguide 704 having an interaction region 706, an optical signal input, and an optical signal output 710.

The acoustic wave exciter 702 may select the band of wavelengths in the optical signal to be effected and also the amount of attenuation on the signal strength of those wavelengths. For one embodiment, the acoustic wave exciter 702 may adjust the radio frequency generated by the signal generator 712 in order to select the desired center optical wavelength in the optical signal that is to be coupled from the first mode to the second mode. In this case, the acoustic wave exciter 702 also acts as a variable attenuator on the center wavelength by adjusting the amplitude of the radio frequency signal driving the acoustic wave generator 708. Depending upon the amplitude of the acoustic wave transmitted to the interaction region 706, a percentage of the corresponding center optical wavelength and the band of wavelengths surrounding the center wavelength couple from the first mode to the second mode. If the optical signal is obtained from the first mode, then all portions of the wavelengths diverted to the second mode will have in effect been attenuated from the optical signal.

Figure 7B:
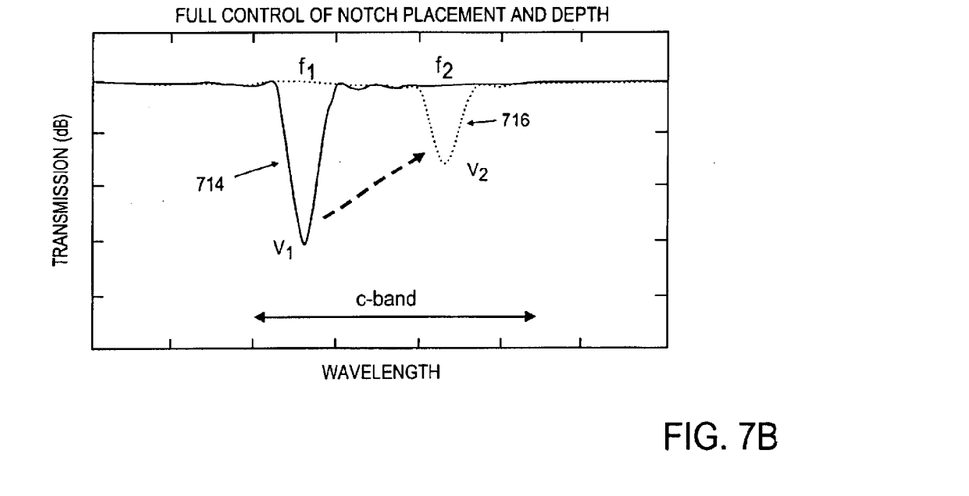
FIG. 7b is a graph illustrating the transmission through the acousto-optic filter for a first acoustic wave having a first amplitude and a second acoustic wave having a second lesser amplitude generated by the acoustic wave exciter.

FIG. 7b is a graph illustrating the transmission through the acousto-optic filter for a first acoustic wave having a first amplitude 714 and a second acoustic wave 716 having a second lesser amplitude generated by the acoustic wave exciter. As noted above, the greater the amplitude, such as V1, of the acoustic wave transmitted to the interaction region, the greater percentage of the corresponding center optical wavelength and the band of wavelengths surrounding the center wavelength couple from the first mode to the second mode. The frequency of the acoustic wave, such as f1 or f2, determines the center wavelength in the optical signal coupled by the acoustic wave.

Either the same acoustic wave exciter or two or more acoustic wave exciters working in conjunction may generate the multiple acoustic waves. Multiple radio frequency ("RF") signals may be applied by one or more signal generators to the acoustic wave generator in order to generate the multiple acoustic waves at different frequencies, such as the first acoustic wave 714 and the second acoustic wave 716, from the same acoustic wave exciter. Multiple acoustic wave exciters may generate a set of acoustic waves at N number of frequencies that corresponds to N number of optical wavelengths. For example, the multiple acoustic wave exciters may generate the first acoustic wave 714 and the second acoustic wave 716. Each acoustic wave in the set of acoustic waves having an amplitude that correlates to a determinable amount of reduction of optical power in the N number of optical wavelengths. The acoustic waves 714, 716 cause the corresponding band of optical wavelengths within the optical signal to couple from a first mode, such as the core mode, to the second mode, such as the cladding mode.

Figure 8A:
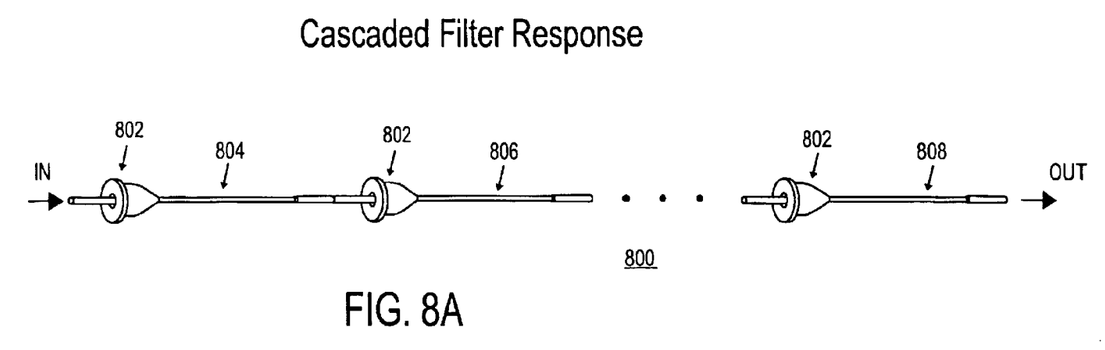
FIG. 8a is a block diagram of an embodiment of multiple cascaded acoustic wave exciters transmitting multiple acoustic waves to shape the transmission response of the optical signal passed through the bandpass filter.

FIG. 8a is a block diagram of an embodiment of multiple cascaded acoustic wave exciters transmitting multiple acoustic waves to shape the transmission response of the optical signal passed through the bandpass filter. For one embodiment, a series of acoustic wave exciters 802 may each be connected to discrete interaction regions 804, 806, 808 in a cascaded manner. Each acoustic wave exciter 802 transmits an acoustic wave at a frequency different that the other acoustic waves.

Figure 8B:
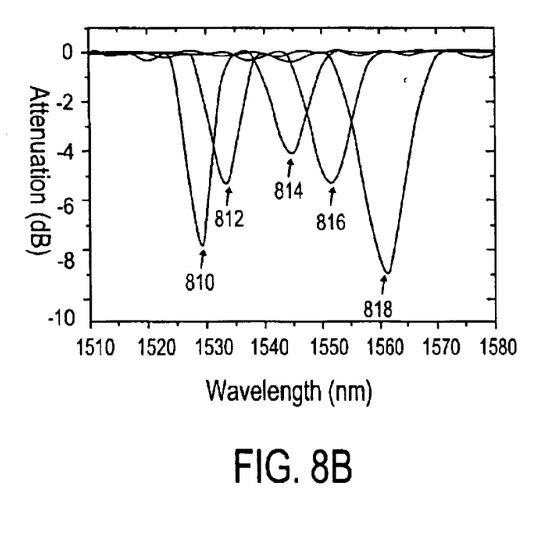
FIG. 8b is a graph of multiple acoustic waves each having discrete amplitudes and discrete frequencies applied to the cascaded interaction region to shape the transmission response of an optical signal passing through the cascaded interaction regions.

FIG. 8b is a graph of multiple acoustic waves each having discrete amplitudes and discrete frequencies applied to the cascaded interaction region to shape the transmission response of an optical signal passing through the cascaded interaction regions. Each acoustic wave at its own frequency corresponds to particular center wavelength in the optical signal such as a first center optical wavelength 810, a second center optical wavelength 812, a third center optical wavelength 814, a fourth center optical wavelength 816, and a fifth center optical wavelength 818.

Figure 8C:
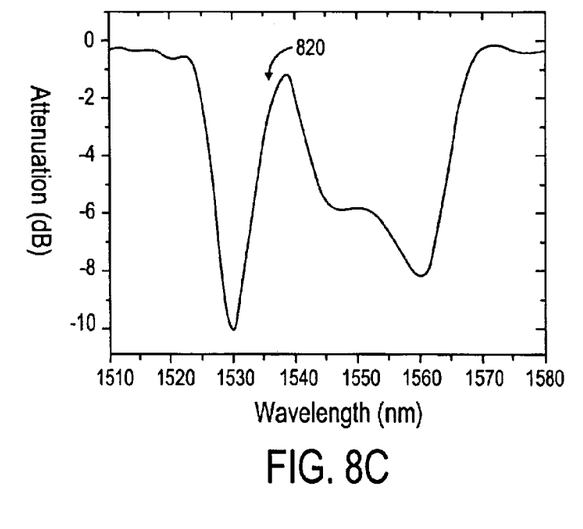
FIG. 8c is a graph of an exemplary transmission spectrum shaped by the application of the multiple acoustic waves.

8c is a graph of an exemplary transmission spectrum shaped by the application of the multiple acoustic waves. Referring to FIGS. 8b and 8c, the multiple acoustic waves 810, 812, 814, 816, 818 may be used to shape the transmission spectrum 820 of optical wavelengths passed by the bandpass filter. For example, as illustrated, the transmission spectrum 820 consists of a band of wavelengths from approximately 1530 nm to 1560 nm that passed by the tunable bandpass filter. The transmission spectrum 820 having a customized asymmetric shape formed by the cumulative attenuation caused by the application of the multiple acoustic waves 810, 812, 814, 816, 818 to the one or more interaction regions in which the optical signal travels through.

Referring to FIGS. 8a, 8b, and 8c, a control component such as a software program may synchronize transmitting the multiple acoustic waves 810, 812, 814, 816, 818 to the one or more interaction regions 804, 806, 808 in order to shape the signal strength and optical wavelengths passed by the bandpass filter 800. The one or more acoustic wave exciters 802 generate multiple band rejection responses that sweep a bandpass of wavelengths across a wavelength spectrum to create a transmission spectrum 820. The tuning can move the transmission spectrum 820 of the optical signal in a step fashion to sweep individual wavelengths within the optical signal. For example, the control component may synchronize the acoustic waves to create transmission spectrum of 1530 nm to 1540 nm. Next, the control component may synchronize the acoustic waves applied to the interaction regions 804, 806, 808 to generate a transmission spectrum 820 of 1540 nm to 1550 nm.

For an alternative embodiment, a first acoustic wave exciter (not shown) and a second acoustic wave exciter couple to the same interaction region rather than cascading the acoustic wave exciters.

Figure 9:
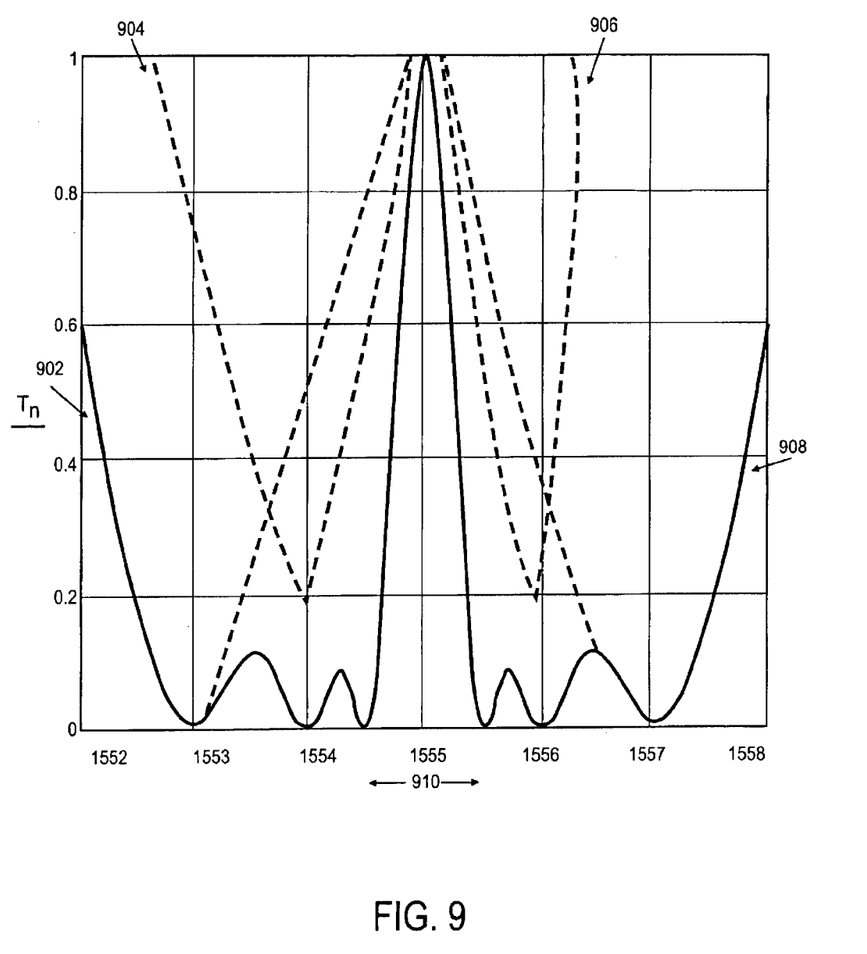
FIG. 9 is a graph of an exemplary narrow band transmission spectrum such as 1555 nm, shaped by a control component synchronizing the application of multiple acoustic waves.

FIG. 9 is a graph of an exemplary narrow band transmission spectrum such as 1555 nm, shaped by a control component synchronizing the application of multiple acoustic waves. The effects of a first acoustic wave 902, a second acoustic wave 904, a third acoustic wave 906, and a fourth acoustic wave summed together may shape a narrow band transmission spectrum 910 of approximately 1554.5 nm to 1555.5 nm. Once the 1555 nm wavelength is developed and collected in the output signal for monitoring purposes, then the control component may generate synchronized acoustic waves to shape a narrow band transmission spectrum of, for example, approximately 1556 nm. Thus, the tuning can move the transmission spectrum 910 of the optical signal in a step fashion to sweep individual wavelengths within the optical signal.

For one embodiment, the tunable bandpass filter is virtually polarization independent because coupling the optical wavelengths in the optical signal through vibrating the optical waveguide causes less than two tenths of a decibel reduction in the optical signal due to polarization effects on the optical signal.

Figure 10:
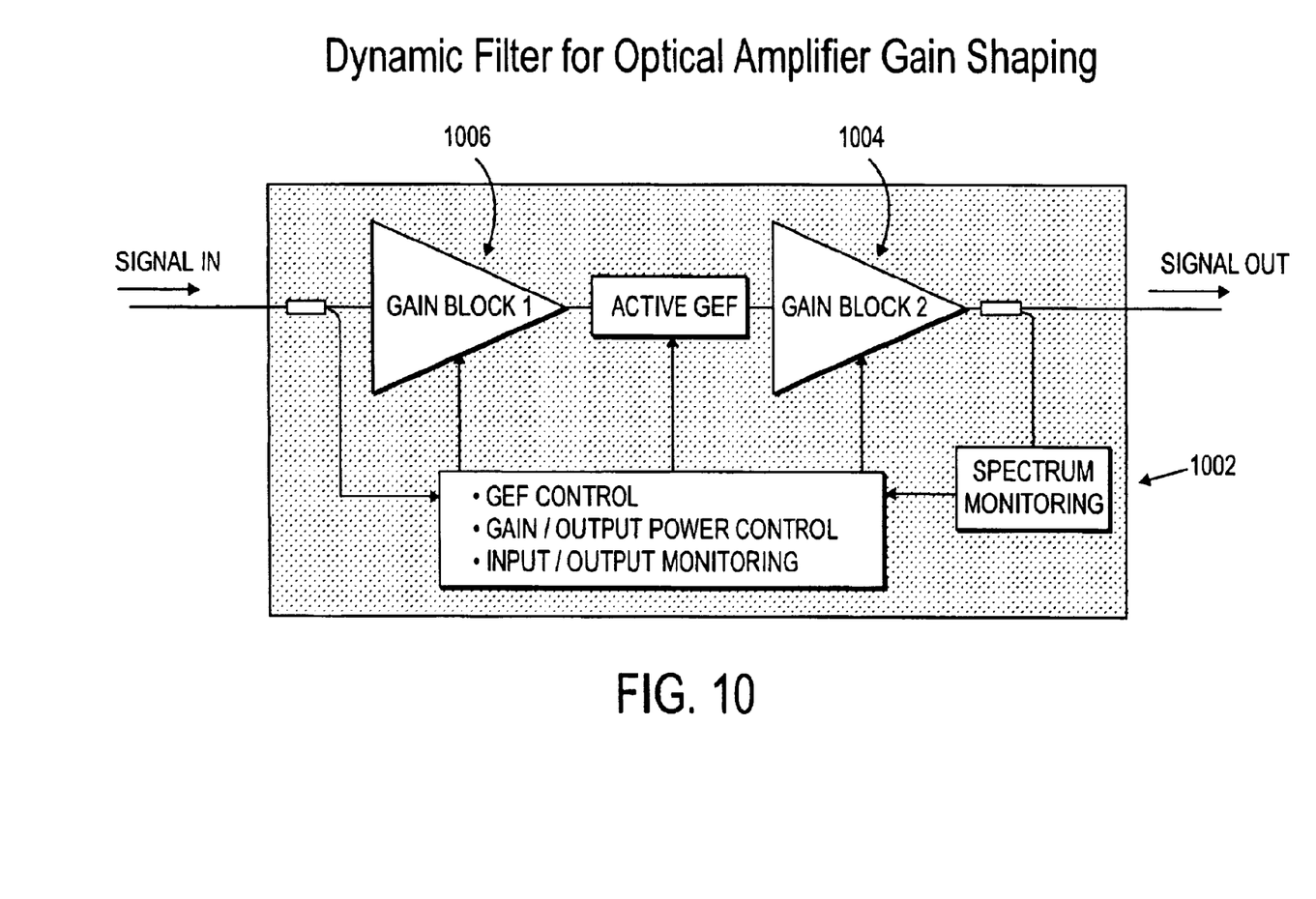
FIG. 10 is a block diagram of an embodiment of an optical monitoring device using an embodiment of the tunable bandpass filter.

FIG. 10 is a block diagram of an embodiment of an optical monitoring device using an embodiment of the tunable bandpass filter. The optical monitoring device 1002 may be an optical power monitor, a spectral analyzer, or similar device. The optical monitoring device 1002, such as a spectrum monitoring device, may be located after a second gain block 1004 in order to determine characteristics of the optical signal and characteristics of the transmission spectrum developed within the bandpass filter. The transmission spectrum may contain characteristics such as optical signal strength, noise level, drift of the wavelengths from nominal, and other similar characteristics.

Optical monitoring device 1002 uses an embodiment of the tunable bandpass filter to obtain a precise representation of discrete wavelengths, such as 1555 nm, within a narrow band of wavelengths, such as 1550 nm to 1560 nm, in order to determine optical characteristics of the particular wavelength. The control component may then sweep the narrow band of wavelengths to determine the optical characteristics for each discrete wavelength within that narrow band. Once those optical characteristics have been determined, then the optical monitoring device 1002 may provide feedback to first gain block 1006 in order to correct any of those characteristic deviating from their desired set point. The optical monitoring device 1002 may determine the characteristics of the wavelength in a given range of wavelength such at 1530 nm to 1560 nm in order to provide feedback to flatten the gain within that range of wavelengths.

For alternative embodiments, most functions performed by electronic hardware components may be duplicated by software emulation.

In the forgoing specification, the invention has been described with reference to specific exemplary embodiments thereof. It will, however, be evident that various modifications and changes may be made thereto without departing from the broader spirit and scope of the invention as set fourth in the appended claims. The specification and drawings are, accordingly, to be regarded in an illustration rather then a restrictive sense.

What is claimed is:

1. An apparatus, comprising:
   an optical waveguide having a core, a cladding, and an interaction region;
   two or more reflectors aligned to facilitate multiple passes of a band of wavelengths within an optical signal through the interaction region, the two or more reflectors including a first reflector and a second reflector;
   an acoustic wave exciter affixed to the interaction region; and
   light-absorbing material interposed between the first reflector and the second reflector.

2. The apparatus of claim 1, wherein the acoustic wave exciter includes an acoustic wave propagation member, a signal generator, and an acoustic wave generator.

3. The apparatus of claim 2, wherein the acoustic wave propagation member comprises an acoustic horn.

4. The apparatus of claim 2, wherein the acoustic wave generator comprises a transducer.

5. The apparatus of claim 1, wherein the first reflector comprises a Fiber Bragg Grating with a reflectivity of less than one hundred percent.

6. The apparatus of claim 1, wherein the first reflector comprises a mirror with a reflectivity of less than one hundred percent.

7. The apparatus of claim 1, wherein the first reflector comprises a recirculator with a reflectivity of less than one hundred percent.

8. The apparatus of claim 1, wherein the first reflector comprises a coupler with a reflectivity of less than one hundred percent.

9. The apparatus of claim 1, wherein the two or more reflectors are aligned to reflect the optical signal bi-directionally through the interaction region.

10. The apparatus of claim 1, wherein the interaction region has a first portion and a second portion, the length of the first portion is based upon an optical wavelength in the optical signal, frequency of the acoustic wave, and type of the fiber.

11. The apparatus of claim 1, wherein the optical waveguide comprises a single mode optical fiber.

12. The apparatus of claim 1, wherein the apparatus comprises an acoustical-optical tunable bandpass filter.

13. The apparatus of claim 12, wherein a transmission spectrum of the acoustical-optical tunable bandpass filter is less than 18 Gigahertz.

14. The apparatus of claim 1, wherein the acoustic wave exciter is tunable to select a center optical wavelength in the optical signal.

15. The apparatus of claim 1, wherein the two or more reflectors further include a third reflector and a fourth reflector aligned to facilitate multiple passes of the optical signal through the interaction region in a unidirectional manner.

16. The apparatus of claim 5, further comprising:
an acoustic wave absorber affixed to the interaction region.

17. The apparatus of claim 1, wherein the light absorbing material includes a fiber Bragg grating aligned to reflect selected wavelengths at an angle out of the optical waveguide.

18. A method, comprising:
receiving an optical signal;
transmitting an acoustic wave at a first frequency that corresponds to a first optical wavelength; the acoustic wave to cause a band of wavelengths within the optical signal to couple from a first mode to a second mode in an optical waveguide;
absorbing the energy of the optical signal in the first mode;
exposing the band of wavelengths in the second mode to the acoustic wave to cause the optical signal to couple from the second mode to the first mode; and
routing the band of wavelengths through the acoustic wave multiple times.

19. The method of claim 18, wherein the first optical wavelength is proportional to a second frequency applied by a signal generator to an acoustic wave generator.

20. The method of claim 18, wherein a percentage of the first optical wavelength coupled from the first mode to the second mode corresponds to a signal strength of the acoustic wave at the first frequency.

21. The method of claim 18, wherein the first mode comprises a core mode.

22. The method of claim 18, wherein the first mode comprises a cladding mode.

23. The method of claim 18, wherein the first mode comprises a polarization mode.

24. The method of claim 18, wherein coupling comprises transitioning energy from a first spatial propagation mode to a second spatial propagation mode.

25. The method of claim 18, wherein multiple times comprises three or more passes.

26. An optical monitoring device, comprising:
an optical signal input;
an acoustic wave exciter;
an optical waveguide having a core, a cladding, and an interaction region;
two or more reflectors aligned to facilitate multiple passes of a band of wavelengths within an optical signal through the interaction region, the two or more reflectors including a first reflector and a second reflector; and
light-absorbing material interposed between the first reflector and the second reflector.

27. The apparatus of claim 26, wherein the optical monitoring device comprises an optical power monitor.

28. The apparatus of claim 26, wherein the optical monitoring device comprises a spectral analyzer.

29. The apparatus of claim 26, wherein the optical waveguide further comprises a jacket surrounding the core and the cladding and the interaction region comprises a section of the optical waveguide where the jacket is removed.

30. An apparatus, comprising:
means for receiving an optical signal;
means for transmitting an acoustic wave at a first frequency that corresponds to a first optical wavelength; the acoustic wave to cause the optical signal to couple from a first mode to a second mode in an optical waveguide;
means for absorbing the energy of the optical signal in the first mode;
means for exposing the optical signal to the acoustic wave to cause the optical signal to couple from the second mode to the first mode; and
means for routing the optical signal through the acoustic wave multiple times.

31. The apparatus of claim 30, wherein the first mode comprises a core mode.

* * * * *